United States Patent [19]

Fox, Sr.

[11] Patent Number: 4,764,272

[45] Date of Patent: Aug. 16, 1988

[54] APPARATUS FOR RECOVERY OF HYDROCARBONS FROM HYDROCARBON/WATER MIXTURES

[76] Inventor: James R. Fox, Sr., 8015 W. Cliff Dr., Knoxville, Tenn. 37909

[21] Appl. No.: 80,296

[22] Filed: Jul. 31, 1987

[51] Int. Cl.⁴ .............................................. B01D 21/24
[52] U.S. Cl. .................................... 210/104; 210/115; 210/188; 210/515; 210/532.1; 210/539
[58] Field of Search ............... 210/104, 112, 115, 188, 210/294, 513, 515, 539, 532.1, 540

[56] References Cited

U.S. PATENT DOCUMENTS

| | | | |
|---|---|---|---|
| 2,284,737 | 6/1942 | Hirshstein | 210/539 |
| 2,946,443 | 7/1960 | Schmidt | 210/513 |
| 3,804,252 | 1/1972 | Rishel | 210/532.1 X |
| 4,367,145 | 1/1983 | Simpson et al. | 210/532.1 X |
| 4,378,290 | 3/1983 | Kennedy | 210/112 X |

*Primary Examiner*—Charles Hart
*Attorney, Agent, or Firm*—Pitts and Brittian

[57] ABSTRACT

A unitized system for the restoration of hydrocarbon-contaminated ground water and other water sources. The system employs two interconnected tanks having substantially the same elevation and mounted upon a transport skid. A first of these tanks provides for separation of the hydrocarbon from the water by gravimetric principles, and the second is a storage tank for water. An outlet from the water storage tank feeds water into a storage pan of an upright air sparging tower also mounted upon the skid. Water pumped from the pan is sprayed countercurrent to forced air flow in the tower so as to remove any entrained vapors from the water. A portion of the water handled by this pumping can be recycled to the separation tank. A level detector in the separation tank controls a preselected water level prior to introduction of contaminated water, and again when separated hydrocarbon has been removed from the separation tank to a product storage tank. The product storage tank is preferably mounted on the skid. The unit can be transported to a site for use, with the only requirements at the site being a source of electrical power and a source of water.

11 Claims, 2 Drawing Sheets

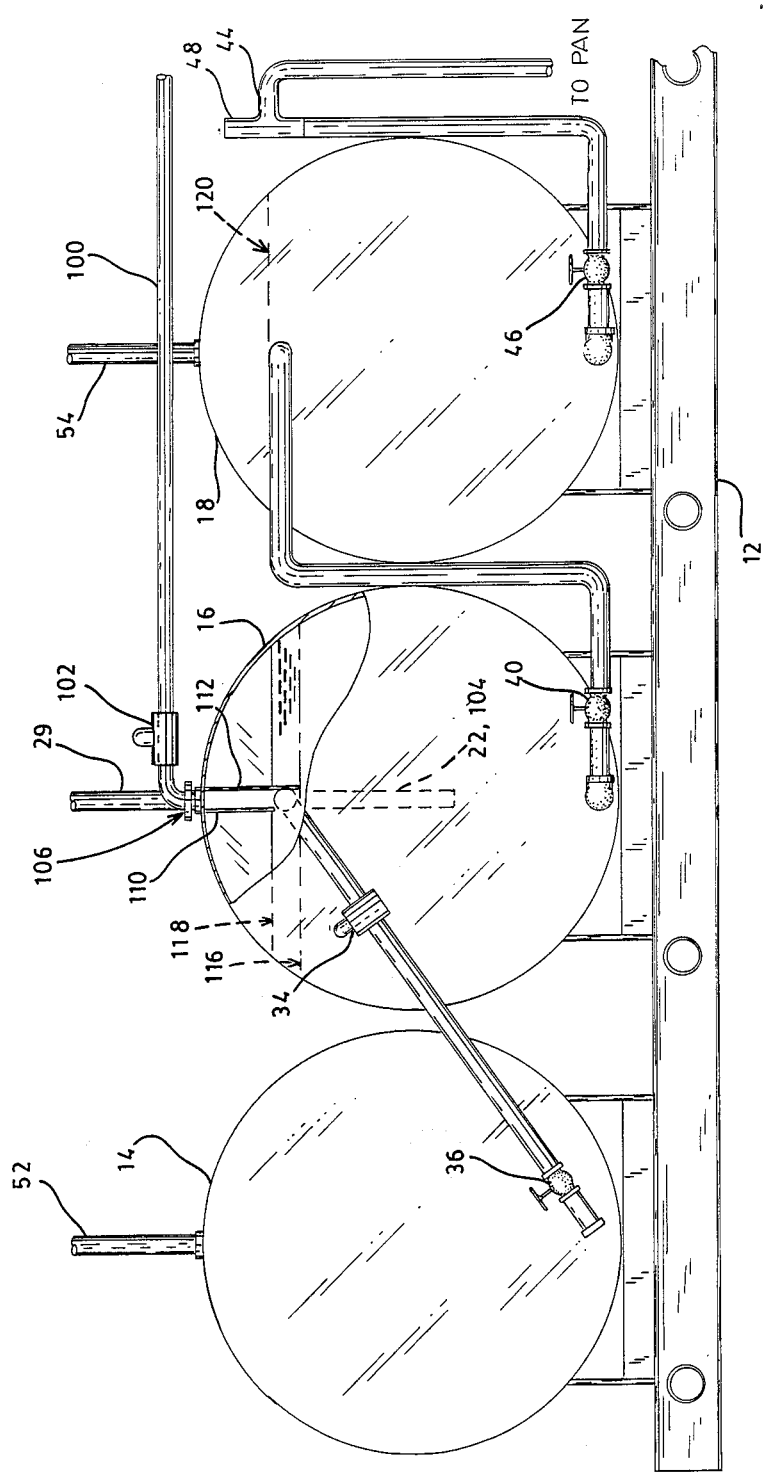

APPARATUS FOR RECOVERY OF HYDROCARBONS FROM HYDROCARBON/WATER MIXTURES

TECHNICAL FIELD

The present invention relates generally to apparatus for separating hydrocarbons from aqueous mixtures of hydrocarbons and water, and more particularly to apparatus for performing this separation in order to recover the hydrocarbon content from environmentally hazardous spills and like sources of such mixtures.

BACKGROUND ART

There are numerous instances where hydrocarbons become mixed with water following leakage from tanks, spills of the hydrocarbon on the ground and condensation that may occur in substantially empty hydrocarbon storage tanks. When accidental spills occur, it is desirable to remove the hydrocarbon content so as to negate environmental problems. Furthermore, where the hydrocarbon is sufficient, it is desirable that this fraction be recovered for reuse.

In the prior art, there are various methods and apparatus which have been developed for this type of separation. These are described, for example, in U.S. Pat. No. 4,132,645, issued to J. C. Bottomly, et al. on Jan. 2, 1979; U.S. Pat. No. 4,145,286, issued to F. P. Bereskain, et al. on Mar. 20, 1979; U.S. Pat. No. 4,273,650, issued to H. W. Solomon on June 16, 1981 and U.S. Pat. No. 4,426,293, issued to D. G. Mason, et al. on Jan. 17, 1984. Each of these systems have been designed for specific applications and the apparatus associated with the methods is sufficiently complex such that the apparatus is substantially a permanent installation. As such, it is difficult to quickly deploy apparatus such that treatment can begin promptly after an accidental spill, for example, to overcome the environmental hazards associated with that spill.

It is, therefore, a principal object of the present invention to provide an apparatus for separating hydrocarbons from hydrocarbon/water mixtures, with this apparatus being sufficiently mobile such that it can be transported to a site for accomplishing the separation and put into operation without any extensive on-site preparation.

It is a further object of the present invention to provide an apparatus for the separation of hydrocarbons from hydrocarbon/water mixtures that is sufficiently compact such that it can be located on a transportable skid so as to be locateable at the site of any hazardous hydrocarbon/water deposit.

It is also an object of the present invention to provide an apparatus for the recovery of the hydrocarbon content of hydrocarbon/water mixtures in a manner that is environmentally acceptable.

These and other objects of the present invention will become more apparent upon a consideration of the full description given hereinafter and by reference to the attached drawings.

DISCLOSURE OF THE INVENTION

In accordance with the present invention, there is provided a system for the gravimetric separation of hydrocarbon products (gasoline, diesel fuel, etc.) from water, with the system adapted for portability if desired or necessary. This system involves principally two gravimetric separation tanks wherein primary separation occurs in one, with the second tank primarily for the storage of the separated water prior to final removal of entrained vapors. A third tank, which can be located proximate the other tanks, serves as a reservoir for the separated hydrocarbons. An air stripping tower provides for the removal of the entrained vapors. Water level sensing electrodes in the primary separation tank actuate the introduction of hydrocarbon-contaminated water, and then the transfer of the separated hydrocarbons into the recovery tank. The system depends upon the displacement of "pure" water by the contaminated water, and further movement of the liquids is provided primarily by a recycle of water. Preferably the entire system, except possibly for an input pump, is mounted upon a skid-type platform for ease in transport and placing into service when at the desired site.

BRIEF DESCRIPTION OF THE DRAWINGS

FIG. 2 is a front elevation of three tanks, with the central tank partially cut-away, as used in the present invention and mounted upon a skid. This FIG. 2 additionally illustrates certain of the interconnecting piping used in the system.

BEST MODE FOR CARRYING OUT THE INVENTION

Figure 1:
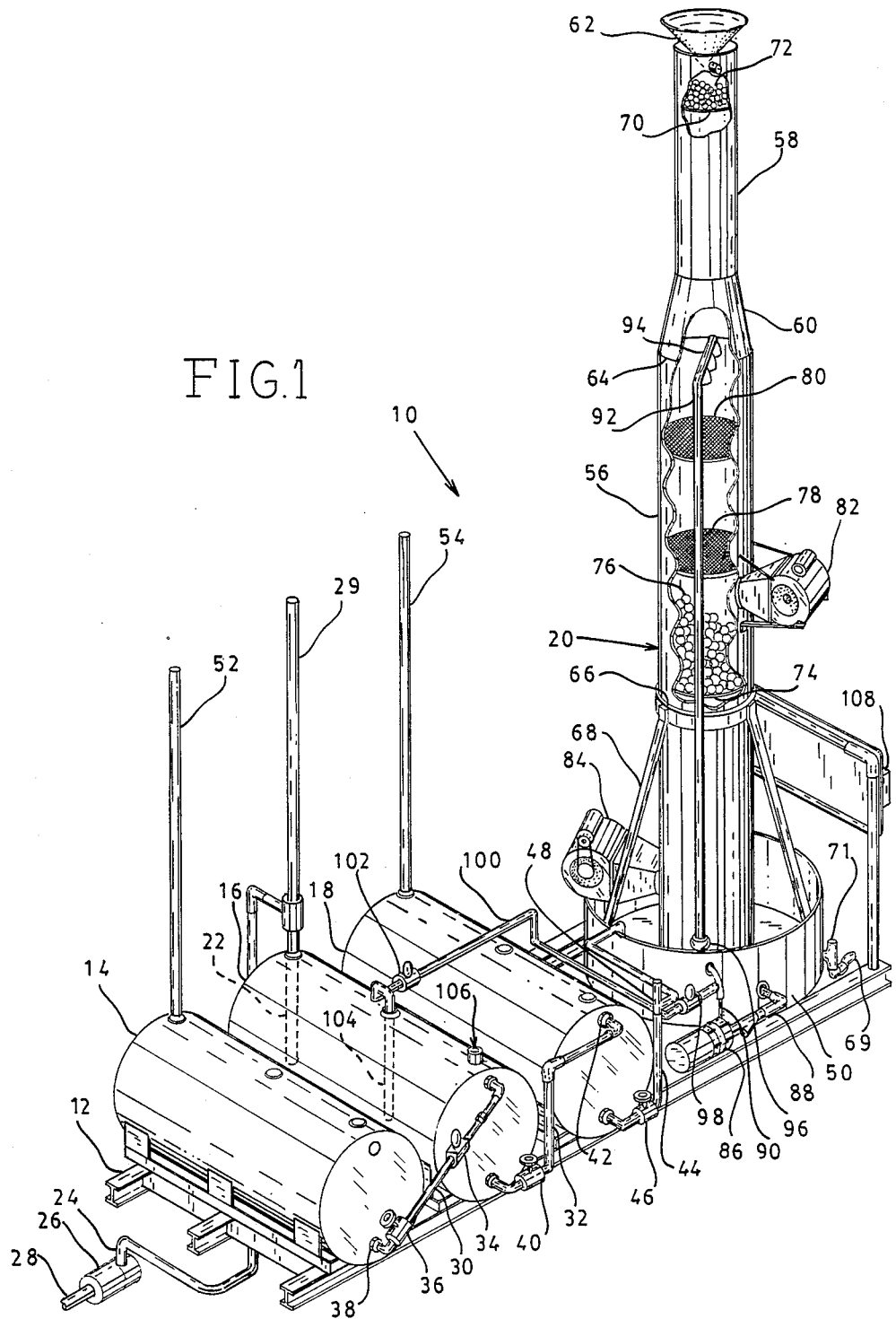
FIG. 1 is a perspective drawing illustrating the components of the present invention.

Referring now to FIG. 1, shown generally at 10 therein, is a system designed to accomplish the above-stated objects relative to the separation of hydrocarbons from hydrocarbon-contaminated water such as found proximate spills of such hydrocarbons. For convenience in moving the system to a processing site, all of the major components are mounted upon a skid-type platform 12, referred to hereinafter just as a "skid". Mounted upon the skid 12 are three storage means in the form of tanks 14, 16, 18 whose purpose will become apparent upon considering the further description hereinafter. At least tanks 16 and 18 are at substantially the same elevation from the skid 12. While the tanks are preferably cylindrical, as shown, the invention is not limited by this configuration as the tanks can be rectangular, spherical, etc. Also, vertically oriented cylindrical tanks could be used if desired. The capacity of the tanks is not critical and will depend upon the particular applications of the system. Typically, however, these tanks can have a capacity of 550 gallons. Also mounted upon the skid is an upright air stripping tower unit (means) 20 is further described hereinafter.

The primary separation of hydrocarbons from water occurs in the central tank 16 (although the tanks could be arranged in different order). This tank 16 has an inlet line 22 that extends well into the tank so that discharge therefrom into the tank occurs below any level of liquid therein. This inlet line is connected to a delivery line 24 leading from a supply pump means 26 located more proximate the source of contaminated water. This pump has an inlet line 28 that extends into the source of the contaminated water (not shown). Tank 16 has an upright vent pipe 29 of sufficient height to prevent the escape of liquid therefrom at the operating pressure of the system.

This tank 16 has a "product" discharge line 30 connected near the top thereof and a water discharge line 32 near the bottom. The product discharge line 30 contains a flow control means 34, typically a solenoid-type valve, as well as an optional manually operated valve 36. The line 30 terminates at a lower inlet port 38 of tank 14 (the product storage tank). The water discharge line 32 typically contains a manually operated valve 40 and terminates at an upper inlet port 42 of tank 18. Tank 18 is primarily a storage tank for water, and has a discharge line 44 from the bottom thereof that typically contains a manually operated valve 46 and syphon break 48 between the tank 18 and the input to a storage pan 50 at the base of the air stripping tower unit 20. Both the product tank 14 and the water tank 18 are typically provided with vent stacks 52, 54, respectively, having a height corresponding to the vent 29 from tank 16. The manually-operated valves, while normally always open, are provided for isolation of components when necessary or desired.

The air stripping tower unit 20 is preferably fabricated of a lower section 56 of one diameter (typically 24 inches, 14 feet long) and an upper section 58 of a smaller diameter (typically 14 inches, 6 feet long), with the sections 56, 58 joined with a (2 foot) transition portion 60. The smaller upper section 58 provides for an increased velocity therethrough, as well as less external wind resistance. Mounted upon the top of the upper section is a rain trap 62 to prevent entry of moisture or debris into the tower unit 20. Preferably, the stripping tower unit 20 is separable into vertical portions for transport of the entire unit to the site. Separation can be effected, for example, at junctions 64, 66. A plurality of support means, e.g., braces 68, maintain the tower unit vertically oriented during transport and during use. The lower section 56 terminates in a closed bottom except for a drain 69 and rests fixedly within the aforementioned storage pan 50. A hydrocarbon monitor 71 is typically located at this drain 69. Although not shown another hydrocarbon monitor can be located at the top of the tower unit to monitor the air discharged therefrom.

In a preferred embodiment of the tower, mounted in the upper portion of upper section 58 is a transverse perforate plate 70 for the support of filter/absorber medium 72, such as charcoal. In a like manner, a perforate plate 74 is positioned in the lower portion of lower section 56 for the support of a packing material 76, such as spherical balls, to provide an extended surface for any liquid traveling down the tower unit 20. At intermediate positions within the lower section 56 are a pair of separated passive atomization means such as screens 78, 80, whose purpose will become apparent upon a consideration of the operation of the tower unit 20. In addition, two air blower units 82, 84 communicate with the interior of the tower unit: one below the packing material 76 and the other below the lower screen 78. The purpose of these blower units will also become apparent from a description of the operation of the tower unit. In some applications of hydrocarbon recovery and water quality improvement, a fewer number of passive atomization means and blower units may be desirable. Also, the packing material may not be needed in those applications. Accordingly, the invention is not to be limited to the exact number of components as long as the air and water are properly contacted to remove entrained material.

A water circulating means, such as pump 86, is mounted proximate the base of the tower unit 20. This pump has an inlet line 88 leading from the storage pan 50, and an outlet line 90. Typically the pumping speed of this recirculating pump can be varied from about 2 to about 15 gallons per minute. The outlet line primarily directs water from the pan 50, through lines 90 and 92, to distribution means in the form of spray heads 94 located within the tower unit above the upper screen 80. This line 92 typically contains a flow meter 96 so that the rate of water flow can be regulated from the pump 86. The output line 90 also feeds a flow control valve, such as solenoid-type valve 98, positioned within feedback line 100 which leads back to the separation tank 16, as shown. A second flow control valve, such as a solenoid-type valve 102, is located at the inlet to tank 16, and this valve discharges into the tank through line 104 that extends well below any liquid level within the tank. This latter valve 102, together with valve 34, are actuated by a water level detector 106 located in tank 16. This is described in more detail in FIG. 2.

The necessary detailed circuitry for the valves, blower motors, etc. is not shown in FIG. 1. However, this circuitry includes wiring leading from a control panel 108 mounted from the skid 12. This circuitry would typically include start/stop switches, timers and the like. For example, switches are included that will stop operation of the unit if the blower units cease to function for any reason. Other necessary or desirable electrical circuitry components will become apparent to persons skilled in the art from the detailed description of operation of the present invention.

In FIG. 2 a portion of tank 16 is cut away in order to better illustrate the water level detector 106. This detector is provided with two conductive probes 110, 112 that respond to water. When water 114 in the tank 16 reaches a first level 116, it contacts probe 112, and when it reaches a second level 118, it contacts probe 110. The function of this detector will be better understood from a detailed description of the operation of the system. This FIG. 2 shows, also, a normal level 120 of water in water storage tank 18. This level 120 is substantially at the same elevation as level 118 in tank 16. It can be seen that these levels are substantially determined from the upper piping connections at 42 and 121.

As stated above, the system of the present invention can be utilized wherever a hydrocarbon-contaminated source of water exists. This source can be, for example, in the ground near an underground storage tank where a tank or piping failure has caused the hydrocarbon (e.g., gasoline) to leak into the ground. This contaminated water would, under such circumstances, be distributed in a rather thin layer beneath the surface. The water source can be first "gathered" into a more localized area utilizing technology discussed in the above-cited U.S. Pat. No. 4,273,650. Having brought the contaminated water into a "cone of depression", the pump 26 of the present invention can be operated to introduce the contaminated water into tank 16. However, prior to introduction of this contaminated water into tank 16, both tanks 16 and 18 are filled through line 100 and valve 102 with uncontaminated water from any source to the levels indicated at 118 and 120. When the water contacts probe 110, this filling ceases (the valves 98 and 102 close). Flow control valve 34 is closed throughout the filling of the tanks with water.

At this point of the cycle, the pump 26 begins to transfer the contaminated water into tank 16 through lines 24 and 22, with the incoming water being injected below the surface of the water 114. This introduction of the contaminated water causes a portion of the water 114 within tank 16 to be displaced from tank 16 into tank 18 through the line 32. This, in turn, displaces a portion of the water from tank 18 into the pan 50 through line 44. During this transfer, the hydrocarbon content separates from, and floats on, the water due to gravimetric separation thereof. This causes the water level in tank 16 to drop with further transfer to tank 18. Typically, the layer of hydrocarbon accumulates to about 2 inches. When the uncontaminated water level in tank 16 reaches the level 116 where it ceases to contact probe 112, the filling ceases and solenoid valve 34 is caused to open. This allows the separated hydrocarbon to flow from tank 16, under the influence of gravity, through line 30 into tank 14 for storage. Since the hydrocarbon very quickly separates from water in tank 16, the hydrocarbon flowing into tank 14 is substantially devoid of water. Following this discharge of the hydrocarbons, the step of refilling tank 16 with water is repeated, etc. As will be discussed, this refill water comes through line 100.

The air tower unit 20 is important to this operation of the tanks 16, 18. As stated above, water is displaced from tank 18 into the pan 50 at the base of the tower unit as the contaminated water enters tank 16. Initially, additional water can be added to this pan. The pump 86 continuously (nominally) withdraws a portion of this water and passes the same up through line 92 to the spray heads 94. This spray passes down through the screen 80 and 82, forming very fine droplets (a mist). The water continues downwardly, coating the surface of the packing 76. This mist like flow of water is counter-current to the flow of air produced by the blowers 82, 84. This counter-current flow causes any entrained volatile materials in the water to be removed, with these volatiles being absorbed in the charcoal as the air is discharged from the top of the stack. Typically this discharged air is continuously monitored to ascertain that the quantity of any hydrocarbons is below the level considered to be environmentally hazardous. Water that has been purged of the entrained volatiles is removed via the drain 69. Since the water is being continuously circulated by the pump 86, a portion can be withdrawn at any time to refill the tank 16. This refilling is accomplished intermittently, as described, through the operation of valves 98 and 102 upon "demand" as detected by the level detector 106.

Of course, the hydrocarbon-contaminated water can be derived from sources other than underground. For example, the contaminated water may already be collected in a ditch. The inlet line 28 to the pump 29 would be positioned so as to remove only the top layer within the ditch. The present system, however, would operate in the same manner to separate out and collect the hydrocarbons. In another typical application, the present system can be used to "process" materials collected in the bottom of storage tanks where water from condensation within the tanks often exists. As before, the pump 26 introduces the contaminated water into tank 16 and the separation is accomplished by tanks 16, 18 and the tower unit 20. Usually the "product" in tank 14 is sufficiently free of water that it can be used for its intended purposes. When all of the components are mounted on a skid 12, as shown, all that is required for set-up at a site is a source of water and power, and the erection of a security fence if desired or necessary. A portable power generator can be, of course, placed on the skid or otherwise transported to the site. Of course, the portions of the tower unit 20 must be assembled if transported as separated sections. If desired, the unit can be fabricated with a deployable security fence.

From the foregoing, it will be understood by one skilled in the art that a system has been described for the "restoration" of ground water (and water from other sources) that has become contaminated with hydrocarbons such as gasoline, diesel fuel, etc. The system is compact and can be quickly transported to a site where such restoration is necessary or desired. The recovered hydrocarbon, in most cases, is sufficiently devoid of water that it can be used for its intended purposes.

The embodiment shown and described herein is given only for the purposes of illustration and not as a limitation of the invention. Accordingly, the invention is to be limited only by the appended claims and their equivalents when taken together with the detailed description.

I claim:

1. A transportable system for the restoration of hydrocarbon-contaminated water whereby the hydrocarbon is recovered for reuse and the water can be disposed of without environmental hazard, which comprises:

a support means adapted to be transportable to a site of said contaminated water;

a first tank means mounted on said support means, said first tank means provided with an inlet line to receive said contaminated water upon demand, said first tank means also being provided with a first outlet proximate an upper portion and a second outlet proximate a lower portion;

a second tank means mounted on said support means proximate said first tank means, said second tank means being at substantially the same elevation as said first tank means, said second tank means being provided with an inlet proximate an upper portion and with an outlet proximate a lower portion;

a first fluid transfer line communicating between said second outlet of said first tank means and said inlet of said second tank means;

a second fluid transfer line having a first end communicating with said first outlet of said first tank means, and a further end, said second fluid transfer line being provided with a flow control means therein;

a vertically oriented air stripping tower means mounted on said support means, said air stripping tower means adapted to countercurrently contact water and air therein, said tower means provided with a water collection pan and a first pumping means to move water from said pan into said tower means;

a third fluid transfer line communicating between said outlet of said second tank means and said collection pan of said tower means;

fluid level detection means mounted within said first tank means, said detection means providing for the establishment of selected upper and lower water levels within said first tank means;

further pump means connected to said inlet line of said first tank means to transfer said contaminated water into said first tank means for gravimetric separation of said hydrocarbon from said water when said fluid level detection means establishes said upper water level and to cease transfer of said contaminated water into said first tank means when said fluid level detection means establishes said lower water level; and control means connected between said level detection means and said flow control means in said second transfer line to open said flow control means when said separated hydrocarbon displaces said water to said lower level and to close said flow control means when said separated hydrocarbon is substantially removed from said first tank means, said control means further connected to said first pumping means whereby a portion of water pumped thereby is recycled to said first tank means to re-establish said upper water level when said flow control means is closed.

2. The system of claim 1 further comprising a third tank means mounted on said support, said third tank means having an inlet at a lower portion thereof communicating with said further end of said second transfer line, said third tank means providing for collection of separated hydrocarbon as delivered by said second transfer line through said flow control means.

3. The system of claim 1 wherein said inlet line of said first tank means extends within said first tank means to a level below said lower water level.

4. The system of claim 1 wherein said air stripping tower means comprises:
   a substantially cylindrical wall member having a lower end, a mid-portion and an upper end;
   a passive atomization means within said tower means extending across the interior thereof proximate said mid-portion;
   spray head means disposed within said tower means at an elevation above said atomization means, said spray head means communicating with said first pumping means; and
   a first source of forced air communicating with the interior of said tower means at an elevation below said atomization means, said source of forced air producing an air flow counter current to flow of water in said tower means whereby said air strips entrained vapors from said water.

5. The system of claim 4 wherein said air stripping tower means further comprises:
   an absorber means for said vapors removed from said water, said absorber positioned within said tower means proximate said upper end of said wall member;
   an extended surface means positioned between said first one source of forced air and said atomization means, said extended surface means intercepting water from said atomization means for contact with air from said forced air source; and
   a vented cap at said upper end of said wall member to prevent ingress of rain and debris into said tower.

6. The system of claim 5 wherein said air stripping tower means further comprises:
   a second passive atomization means within said tower means at an elevation between said first passive atomization means and said extended surface means; and
   a second forced air source communicating with said tower means at an elevation between said extended surface means and said second passive atomization means.

7. A transportable system for the restoration of hydrocarbon-contaminated water whereby the hydrocarbon is recovered for reuse and the water can be disposed of without environmental hazard, which comprises:
   a support means adapted to be transportable to a site of said contaminated water;
   a first tank means mounted on said support means, said first tank means provided with an inlet line to receive said contaminated water upon demand, said inlet line extending into said first tank means to a selected elevation, said first tank means also being provided with a first outlet proximate an upper portion and a second outlet proximate a lower portion;
   a second tank means mounted on said support means proximate said first tank, said second tank means being at substantially the same elevation as said first tank means, said second tank means being provided with an inlet proximate an upper portion and with an outlet proximate a lower portion;
   a first fluid transfer line communicating between said second outlet of said first tank means and said inlet of said second tank means;
   a second fluid transfer line having a first end communicating with said first outlet of said first tank means, and a further end, said second fluid transfer line being provided with a flow control means therein;
   a vertically oriented air stripping tower means mounted on said support means adjacent said second tank means to counter-currently contact water and air therein, said air stripping tower means having a lower portion terminating in a base, a mid-portion and an upper end, said air stripping tower means provided with
      a. a water collection pan at said base thereof,
      b. a first interior passive atomization means positioned intermediate said base and said mid-portion,
      c. a first source of forced air communicating with said tower means at an elevation below said first passive atomization means, and
      d. with water spray means at an elevation above said first passive atomization means;
   first pumping means having an inlet communicating with said pan and an outlet communicating with said spray means for transfer of water from said pan into said tower means;
   a third transfer line communicating between said outlet of said second tank means and said collection pan of said tower means;
   fluid level detection means mounted within said first tank means, said level detection means providing for the establishment of selected upper and lower water levels within said first tank means, said selected upper and lower water levels being at an elevation above said inlet line of said first tank means;
   further pump means connected to said inlet line of said first tank means to transfer said contaminated water into said first tank means for gravimetric separation of said hydrocarbon from said water when said fluid level detection means establishes said upper water level and to cease transfer of said contaminated water into said first tank means when said fluid level detection means establishes said lower water level; and
   control means connected between said level detection means and said flow control means in said second transfer line to open said flow control means when said separated hydrocarbon displaces said water to said lower level, and to close said flow control means when said separated hydrocarbon is substantially removed from said first tank means, said control means further connected to said first pumping means whereby a portion of water pumped thereby is recycled to said first tank means to re-establish said upper water level when said flow control means is closed.

8. The system of claim 7 further comprising a third tank means mounted on said support, said third tank means having an inlet at a lower portion thereof communicating with said further end of said second transfer line, said third tank means providing for collection of separated hydrocarbon as delivered by said second transfer line through said flow control means.

9. The system of claim 7 wherein said air stripping tower means further comprises:
   an absorber for vapors removed from said water by said forced air, said absorber positioned within said tower means proximate said upper end;
   an extended surface means positioned between said first passive atomization means and said first source of forced air;
   a second passive atomization means within said tower means positioned between said extended surface means and said first passive atomization means;
   a second source of forced air communicating with said tower means at an elevation between said extended surface means and said second passive atomization means; and
   a vented cap at said upper end of said tower means to prevent ingress of rain and debris into said tower and permit exit of air from said tower means.

10. The system of claim 7 wherein said air stripping tower means is provided with a drain for removing water therefrom, said drain being provided with a hydrocarbon detection monitor.

11. A transportable system for the restoration of hydrocarbon-contaminated water wherein said hydrocarbon is separated from water by gravimetric principles whereby said hydrocarbon is recovered for reuse and said water can be disposed of without environmental hazard, which comprises:
   a support means adapted to be transportable to a site of said contaminated water;
   a first tank means adapted for said gravimetric separation mounted on said support means, said first tank means provided with an inlet line extending into said first tank means to an elevation below selected upper and lower water levels to receive said contaminated water upon demand, said first tank means also being provided with a first outlet proximate an upper portion and a second outlet proximate a lower portion;
   a second tank means for water storage mounted on said support means proximate said first tank means, said second tank means being at substantially the same elevation as said first tank means, said second tank means being provided with an inlet proximate an upper portion and with an outlet proximate a lower portion;
   a third tank means for collection of separated hydrocarbon mounted on said support means, said third tank means having an inlet proximate a lower portion thereof;
   a first fluid transfer line communicating between said second outlet of said first tank means and said inlet of said second tank means;
   a second fluid transfer line having a first end communicating with said first outlet of said first tank means and a further end communicating with said inlet of said third tank means, said second fluid transfer line being provided with a first flow control means therein;
   fluid level detection means mounted within said first tank means, said fluid level detection means being provided with two conductive probes extending to different elevations within said first tank means to establish said upper and lower water levels;
   a vertically oriented air stripping tower means mounted on said support means, said air stripping tower means adapted to counter-currently contact water and air therein for removal of entrained vapors from said water, said tower means being a substantially cylindrical wall member having a lower end terminating in a base, a mid-portion and an upper end, said tower means being provided with
     a. a collection pan surrounding said base,
     b. an absorber means for collecting said vapors removed from said water, said absorber means positioned within said tower means proximate said upper end of said wall member,
     c. a first passive atomization means interior said wall means extending across said tower means at an elevation below said mid-portion of said wall member,
     d. a second passive atomization means extending across said tower means at an elevation below said first passive atomization means,
     e. an extended surface means extending across said tower means at an elevation below said second passive atomization means, said extended surface means being a plurality of substantially spherical members supported upon a perforate member,
     f. a first forced air source communicating with said tower means at an elevation between said base and said extended surface means,
     g. a second forced air source communicating with said tower means at an elevation between said extended surface means and said second passive atomization means,
     h. a vented cap at said upper end of said wall member to prevent ingress of rain and debris into said tower means and provide for exit of air from said first and second sources of forced air, and
     i. a spray head mounted within said tower means at an elevation between said absorber means and said first passive atomization means;
   a third fluid transfer line communicating between said outlet of said second tank means and said collection pan of said tower means;
   first pumping means having an inlet connected to said collection pan and an outlet connected to said spray head within said tower means for transferring water from said pan into said tower means;
   a fourth fluid transfer line communicating between said first pumping means and said inlet to said first tank means, said fourth fluid transfer line being provided with a second flow control means therein;
   further pump means connected to said inlet line of said first tank means to transfer said contaminated water into said first tank means for said gravimetric separation of said hydrocarbon from said water when said fluid level detection means establishes said upper water level add to cease transfer of said contaminated water into said first tank means when said fluid level detection means establishes said lower water level; and control mans connected between said level detection means and said first flow control means in said second transfer line to open said first flow control means when said separated hydrocarbon displaces water in said first tank means to said lower level, and to close said first flow control means when said separated hydrocarbon is substantially removed from said first tank means, said control means further connected to said second flow control means whereby a portion of water pumped by said first pumping means is recycled to said first tank means through said fourth fluid transfer line to re-establish said upper water level when said first flow control means is closed.

* * * * *